W. G. TEMPLETON.
WINDOW SHADE FIXTURE.
APPLICATION FILED OCT. 5, 1909.

962,270.

Patented June 21, 1910.

Witnesses
E. G. Stewart
Mason B. Lawton

Inventor
William G. Templeton.
By C. A. Snow & Co.
Attorneys

UNITED STATES PATENT OFFICE.

WILLIAM G. TEMPLETON, OF COLORADO SPRINGS, COLORADO.

WINDOW-SHADE FIXTURE.

962,270.  Specification of Letters Patent.  Patented June 21, 1910.

Application filed October 5, 1909. Serial No. 521,029.

*To all whom it may concern:*

Be it known that I, WILLIAM G. TEMPLETON, a citizen of the United States, residing at Colorado Springs, in the county of El Paso and State of Colorado, have invented a new and useful Window-Shade Fixture, of which the following is a specification.

The objects of the invention are, generally, the provision of a support for a window-shade or curtain, adapted to be mounted upon a window-frame and to be raised or lowered, upon said frame without binding, the construction being such that a single cord will be effective to raise and to lower the support.

To this end, the invention consists in providing a transversely disposed shade-carrying bar with guides of novel and improved construction, and so assembling, with the shade-carrying bar and with the window-frame, a flexible element, that the bar and the shade which is carried thereby may readily be raised and lowered.

The drawings show but one form of the invention, and it is to be understood that changes, properly falling within the scope of what is claimed, may be made, without departing from the spirit of the invention.

Similar numerals of reference are employed to denote corresponding parts throughout the several figures of the drawings, wherein;—

Figure 1:
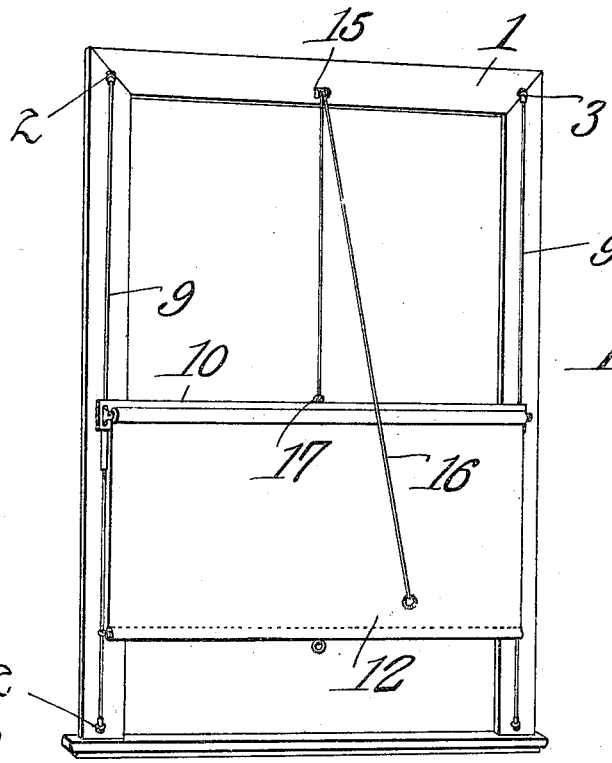
Figure 3:
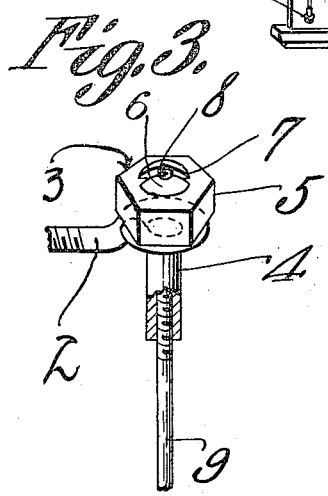
Figure 2:
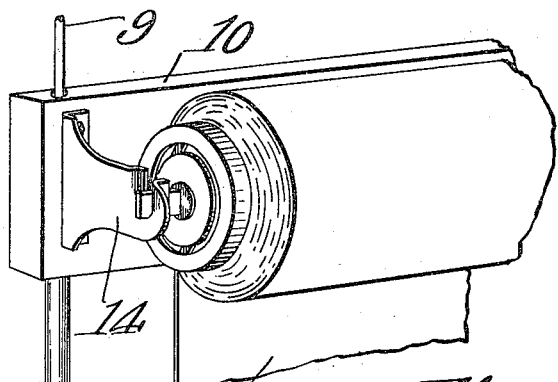

Figure 1 is a perspective, showing the device of my invention mounted upon a window-frame; Fig. 2 is a detail perspective of one end of the shade-carrying bar, showing one of the guides, and a portion of the rod upon which said guide is adapted to slide; and Fig. 3 is a detail perspective adapted to show the means whereby the rods upon which the device slides, are assembled with the window-frame.

In the drawings, there is shown a window-frame 1, carrying, adjacent its top and bottom, vertically alined brackets 2, which may take the form of screw-eyes or the like. These brackets 2 are adapted to receive nuts 3 which, as shown most clearly in Fig. 3, comprise a tubular portion 4 which is adapted to fit closely in the bracket 2, and a laterally extending head 5, which is rendered polygonal, that the same may readily be grasped by a wrench or spanner. Rising from the head 5, is a rounded boss 6, provided with a kerf 7 into which a screw-driver may be introduced. Extending through the nut from end to end, is an opening 8, and this opening is threaded to receive the threaded end of a rod 9.

The device further includes a rigid bar 10 which is adapted to extend transversely of the window-frame 1, from one of the rods 9 to the other. This bar 10 is provided, adjacent its ends, with depending, tubular guides 11, adapted to receive, in sliding relation, the rods 9. The bar 10 is adapted to carry a curtain 12 which may be of any form, and assembled with the bar 10 in any manner. In the present instance, the bar 10 is provided with curtain brackets 14, adapted to receive the extremities of a spring actuated roller, upon which the curtain 12 is wound in the usual manner.

Mounted upon the upper portion of the frame 1, and midway between the guides 11, is a pulley 15, adapted to receive the intermediate portion of a flexible element 16, one end of which is connected with the bar 10, midway between the guides 11, as shown at 11. The pulley 16 may be of the ordinary jam type, adapted to retain the cord, when the cord is moved laterally out of the tread of the pulley, the construction being well known.

The guides 11 which are carried by the ends of the bar 10 prevent the bar from attaining an oblique position between the rods 9, which oblique position would result in the bar 10 being jammed or wedged between the rods 9. It is to be noted that but a single cord is employed for raising and for lowering the bar 10, and that one end of this cord is connected with the bar 10 exactly midway between the guides 11, the pulley 15, over which the member 16 passes, moreover, being located exactly midway between the guides 11. By this construction, it is impossible to exert an upward pull upon the bar 10 at any point other than midway between the guides 11, and this fact, together with the location and construction of the guides 11 makes it impossible for the shade to be operated otherwise than smoothly and evenly, even when the device is manipulated by children or ignorant persons.

The construction of the device is such that, as hereinbefore pointed out, it may be manipulated by a single cord, the multiplicity of cords commonly necessary in order to secure a smooth and even working of the device being rendered unnecessary, owing to the manner of mounting the member 16, and owing to the further fact that the guides 11 are provided.

The nuts 3 are so constructed that the rods 9 may be mounted securely in place, the tubular portions 4 of the nuts 3, fitting closely within the brackets 2, preventing the rods 9 from having any lateral movement within the brackets. The laterally extending heads 5 of the nuts, engaging the brackets upon their remote faces, serve to straighten the rods 9 and to hold the same securely in place, it being noted that the nuts may readily be rotated by inserting a screw driver into the kerf 7, or, should the opening 8 in the kerf 7 be occupied by the end of the rod 9, by engaging the polygonal heads 5, with a wrench or spanner.

Having thus described the invention what is claimed is:—

A device of the class described comprising a frame; vertically alined brackets mounted upon opposite sides of the frame; rods mounted in the brackets and having threaded ends arranged to extend above and below the brackets; nuts, each comprising a tubular portion to fit closely within the brackets and threaded to engage the ends of the rods, and a polygonal, laterally extending head to engage the brackets, the head having an upstanding boss provided with a kerf; a rigid bar arranged to extend transversely of the frame; tubular guides depending from the bar and arranged to receive the rods in sliding relation; a curtain carried by the bar; a pulley mounted upon the top of the frame between the guides; and a flexible element passed over the pulley and at one end assembled with the bar between the guides.

In testimony that I claim the foregoing as my own, I have hereto affixed my signature in the presence of two witnesses.

WILLIAM G. TEMPLETON.

Witnesses:
J. T. LAWSON,
C. E. PREINKERT.